(12) United States Patent
Regensburger et al.

(10) Patent No.: US 6,201,231 B1
(45) Date of Patent: Mar. 13, 2001

(54) TESTING SYSTEM FOR MEASURING AND OPTIMISING TARGET TRACKING SYSTEMS

(75) Inventors: Martin Regensburger, Neumarkt; Peter Kassens, Ruckersdorf, both of (DE)

(73) Assignee: Diehl Stiftung & Co., Nürnberg (DE)

( * ) Notice: Subject to any disclaimer, the term of this patent is extended or adjusted under 35 U.S.C. 154(b) by 0 days.

(21) Appl. No.: 09/165,332

(22) Filed: Oct. 1, 1998

(30) Foreign Application Priority Data

Oct. 2, 1997 (DE) .............................. 197 43 652

(51) Int. Cl.⁷ .................................. G01C 21/02
(52) U.S. Cl. .................. 250/203.6; 250/203.2; 356/139.08
(58) Field of Search .............. 250/203.6, 203.2, 250/203.1; 356/139.08, 139.01; 244/3.14, 3.15, 3.16

(56) References Cited

U.S. PATENT DOCUMENTS 4,349,838 * 9/1982 Daniel ................................ 358/125
5,600,434 * 2/1997 Warm et al. .................... 356/139.08

FOREIGN PATENT DOCUMENTS 44 02 855 C2    8/1995  (DE) .
44 30 830 A1    3/1996  (DE) .

* cited by examiner

Primary Examiner—Que T. Le
(74) Attorney, Agent, or Firm—Scully, Scott, Murphy & Presser

(57) ABSTRACT

Described is a testing system which has a target point light source (12), a tracking light source (18) and therebetween a projection wall (24). Associated with the target point light source (12) is a two-axis deflection device (28) which is connected together with a target point computer (14). Associated with the tracking light source (18) is a two-axis scanner device (30) which is connected together with a tracking computer (20). Provided between the tracking light source (18) and the two-axis scanner device (30) is a beam splitter (32) with which a sensor device (42) is associated.

8 Claims, 1 Drawing Sheet

THE FIGURE
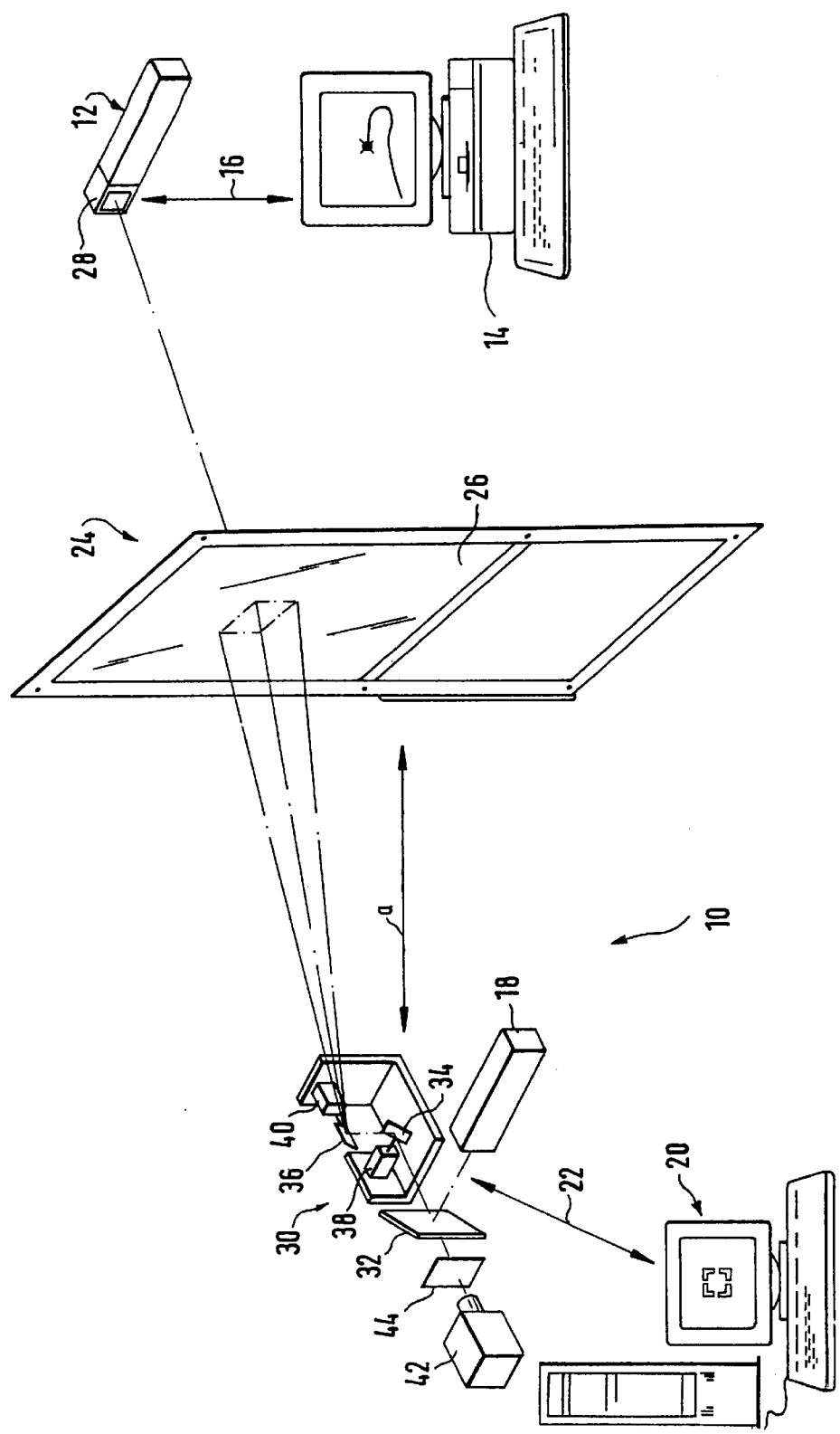

TESTING SYSTEM FOR MEASURING AND OPTIMISING TARGET TRACKING SYSTEMS

BACKGROUND OF THE INVENTION

1. Field of the Invention

The invention concerns a testing system, wherein field tests can be very substantially obviated.

Hitherto the procedure involved for example is such that, in laboratory tests, the target movement is simulated by means of a robot; in cases in which high-speed targets such as for example missiles are to be tracked however the dynamics of the robot are often not sufficiently great enough so that expensive field tests become necessary.

2. Description of the Prior Art

Warm et al., U.S. Pat. No. 5,600,434 which is commonly assigned to the assignee of the present application, discloses an apparatus for repelling an air target missile with an infra-red search head, for attacking an aircraft. The aircraft is equipped with a laser source whose laser beam can be directed against the attacking air target missile by way of the optical follower arrangement of a target tracking system. The laser beam operates in a given frequency band which is in the region of the detection frequency of infra-red search heads. The laser beam is cyclically operated at a frequency which corresponds to the usual reticle frequency of infra-red search heads.

Furthermore, U.S. Pat. No. 5,600,434 describes an apparatus for repelling an air target missile with search head target tracking, for attacking an aircraft. In this case also the aircraft has a laser source whose laser beam can be directed against the attacking missile by way of an optical follower arrangement of a target tracking system, as a defence beam. In that arrangement, to eliminate the influence of vibrations of the aircraft on target tracking the target tracking system, in addition to the tracking regulating circuit provided, is equipped with a high-frequency anti-vibration regulating circuit which is connected to an associated optical anti-vibration system which is arranged in the beam path of the optical tracker arrangement.

SUMMARY OF THE INVENTION

The object of the present invention is to optimise a target tracking system without the need for field tests as have been referred to in the opening part of this specification.

In accordance with the invention a light source which is projected by means of a two-axis deflection device onto a wall is used as a target simulator. A tracking light source is superimposed on the target tracking system to be tested, for the purposes of visualisation of the orientation.

The testing system according to the invention affords the advantage that reproducible experiments can be implemented at any time without the limitations which are involved with field tests. The testing system according to the invention also enjoys the advantages that it is inexpensive to produce and can be used irrespective of weather. Furthermore any reproducible target movements can be implemented with the testing system according to the invention. Tracking differences can be perceived directly at the intermediate wall which preferably has a ground glass screen. In the case of the testing system according to the invention absolute or relative target movements are projected onto the said intermediate wall. Those target movements are followed by the target tracking system. In that situation the target tracking system, that is to say the tracking light source, by means of the two-axis scanner device associated therewith, projects its own path, preferably in a different colour, onto the same wall, that is to say onto the above-mentioned intermediate wall. In order to avoid the target tracking system being disturbed by its own light source, arranged between the scanner device and the tracking sensor is a selective filter or beam splitter which prevents radiation from its own light source impinging on the tracking sensor. The target point computer and the tracking computer serve to bring into alignment the flight path curves of the target point light source and the tracking paths of the tracking light source. As already mentioned above, tracking differences can be perceived directly on the intermediate wall, that is to say the ground glass screen.

BRIEF DESCRIPTION OF THE INVENTION

An embodiment of the testing system according to the invention is described hereinafter and illustrated in The FIGURE.

DETAILED DESCRIPTION OF A PREFERRED EMBODIMENT

The FIGURE diagrammatically shows a perspective view of an embodiment of the testing system 10 having a target point light source 12 which is connected together with a target point computer 14, as is indicated by a double-headed arrow 16, a tracking light source 18 which is connected together with a tracking computer 20, as is indicated by a double-headed arrow 22, and a projection wall 24 between the target point light source 12 and the tracking light source 18. The projection wall 24 either has a transmitting glass ground screen 26 or is diffusely reflecting.

The computers 14,20 are adapted to compute the alignment of the first and second light points on the projection wall 24, so as to provide indication of accuracy of the scanner device 30 in detecting the alignment of the light points, and resultingly, the efficacy of the target tracking system.

The target point light source 12 has associated therewith a two-axis deflection device 28 which is operatively connected to the target point computer 14. A two-axis scanner device 30 is associated with the tracking light source 18 by way of a beam splitter 32. The two-axis scanner device 30 has two direction-changing mirrors 34 and 36 which are pivotable in mutually perpendicular directions in space by means of associated control elements 38 and 40. A sensor device 42 is also associated with the beam splitter 32, in addition to the tracking light source 18. A colour filter 44 is arranged between the sensor device 42 and the beam splitter 32.

Alternatively both the target point light source and also the tracking system can be arranged on one side of the projection wall, in which case that wall must be diffusely reflecting.

What is claimed is:

1. A test installation (10) for a target tracking system (20, 30) having a scanner device (30); a selectively light-transmissive or reflective projection wall (24) arranged in spaced relationship from said target tracking system (20, 30); a first wandering light point being projected onto said projection well (24) by a target point light source (12) so as to represent a simulated target, said scanner device (30) including a second light source (18) projecting a second light point onto said projection wall (24) for following of sad first wandering light point to provide a control over the scanner device (30) actually detecting the wandering target simulating light point, and means (20,14) for computing the alignment of said first and second light points on said projection wall, whereby said second light point being located more closely to the target-simulating light point is indicative of said scanner device (30) being more precise in tracking the movement of said wandering target-simulating light point.

2. A test installation according to claim 1, wherein said target point light source (12) has a two-axis deflection device (28) operatively associated therewith for projecting said target-simulating wandering light point onto said projection wall (24); and a target point computer (14) being connected to said two-axis deflection device (28).

3. A test installation according to claim 1, wherein said second light source (18) comprises a tracking light source arranged on an optical axis of the tracking system, said scanner device comprising a two-axis scanner device; a beam splitter (32) being arranged between said tracking light source (18) and said two-axis scanner device (30); and a sensor (42) being operatively associated with said beam splitter (32).

4. A test installation according to claim 1, wherein said target point light source (12) comprises a target point laser.

5. A test installation according to claim 1, wherein said second light source (18) comprises a tracking laser.

6. A test installation according to claim 3, wherein a color filter (44) is arranged between said sensor (42) and said beam splitter (32).

7. A test installation according to claim 1, wherein said projection wall (24) comprises a light-transmissive ground glass screen (26).

8. A test installation according to claim 1, wherein said projection wall (24) comprises a diffusely light-reflecting material.

* * * * *

UNITED STATES PATENT AND TRADEMARK OFFICE
CERTIFICATE OF CORRECTION

PATENT NO.    : 6,201,231 B1
DATED         : March 13, 2001
INVENTOR(S)   : M. Regensberger et al.

It is certified that error appears in the above-identified patent and that said Letters Patent is hereby corrected as shown below:

Title page,
Item [30], Foreign Application Priority Data, "197 43 652" should read
-- 197 43 652.8 --

Column 2,
Line 16, "BRIEF DESCRIPTION OF THE INVENTION" should read -- BRIEF DESCRIPTION OF THE DRAWINGS --
Line 19, "The FIGURE" should read -- The Figure --
Line 23, "The FIGURE" should read -- The Figure --
Line 65, "sad" should read -- said --

Signed and Sealed this

Twenty-seventh Day of August, 2002

Attest:

Attesting Officer

JAMES E. ROGAN
Director of the United States Patent and Trademark Office